US006754701B1

(12) United States Patent
Kessner

(10) Patent No.: US 6,754,701 B1
(45) Date of Patent: Jun. 22, 2004

(54) USE OF A SINGLE THREAD TO SUPPORT MULTIPLE NETWORK CONNECTIONS FOR SERVER LOAD TESTING

(75) Inventor: Amir Kessner, Ramat-Gan (IL)

(73) Assignee: Mercury Interactive Corporation, Sunnyvale, CA (US)

( * ) Notice: Subject to any disclaimer, the term of this patent is extended or adjusted under 35 U.S.C. 154(b) by 0 days.

(21) Appl. No.: 09/565,832

(22) Filed: May 5, 2000

(51) Int. Cl.[7] .................. G06F 15/16; G06F 15/173; G06F 11/00
(52) U.S. Cl. ................ 709/219; 709/233; 709/203; 714/38; 714/43
(58) Field of Search ............................ 709/217–219, 709/223, 224; 714/43, 4, 25, 37–38

(56) References Cited

U.S. PATENT DOCUMENTS

| | | | |
|---|---|---|---|
| 5,812,780 A | | 9/1998 | Chen et al. |
| 5,819,066 A | | 10/1998 | Bromberg et al. |
| 5,958,008 A | | 9/1999 | Pogrebisky et al. |
| 5,974,572 A | * | 10/1999 | Weinberg et al. ............. 714/47 |
| 6,044,398 A | * | 3/2000 | Marullo et al. ............. 709/219 |
| 6,108,700 A | | 8/2000 | Maccabee et al. |
| 6,157,940 A | | 12/2000 | Marullo et al. |
| 6,167,534 A | * | 12/2000 | Straathof et al. ............. 714/38 |
| 6,185,701 B1 | * | 2/2001 | Marullo et al. ............. 709/219 |
| 6,249,886 B1 | | 6/2001 | Kalkunte |
| 6,304,982 B1 | * | 10/2001 | Mongan et al. ............... 714/38 |
| 6,324,492 B1 | | 11/2001 | Rowe |

OTHER PUBLICATIONS

Pai, Vivek S. et al.: "Flash: An Efficient and Portable Web Server," *Proceedings of the 1999 USENIX Annual Technical Conference*, 'Online! Jun. 6–11, 1999, pp. 1–14, Monterey, California, USA, XP-002186880.

van Gulik, Dirk–Willem: "The DB engine," RDFSTORE Documentation, 'Online! Aug. 1999, pp. 1–2, XP-002186881.

Neilsen, Henrik Frystyk: "Threads and Event Loops," The World Wide Web Consortium, 'Online! Jul. 13, 1999, pp. 1–2, XP-002186882.

International Search Report mailed on Jan. 25, 2002 in corresponding International Application No. PCT/US01/10686.

Description of Prior Art Techniques Included in Accompanying IDS, dated today, Sep. 20, 2000.

* cited by examiner

*Primary Examiner*—David Wiley
*Assistant Examiner*—Joseph E Avellino
(74) *Attorney, Agent, or Firm*—Knobbe, Martens, Olson & Bear LLP

(57) ABSTRACT

A load testing system for testing a web site or other type of server system uses a thread architecture that reduces the computing resources needed to generate a desired load. The load testing system runs several virtual users on one or more clients to simulate user interactions with the web site. Each virtual user is executed as a virtual user thread under a process on a client computer. Each virtual user thread itself establishes and supports multiple connections to the web site; therefore, an additional thread need not be created for each connection. For each connection, the virtual user thread performs a sequence of functions in an asynchronous mode to establish and support the connection. If a function cannot complete without blocking, it immediately returns a RESOURCE UNAVAILABLE error code. If a function returns a RESOURCE UNAVAILABLE code, the calling thread switches execution to another task. After the condition causing the RESOURCE UNAVAILABLE error code has been resolved, the thread can switch back to executing the interrupted task. In this manner, the single thread is able to support multiple simultaneous connections.

30 Claims, 9 Drawing Sheets

USE OF A SINGLE THREAD TO SUPPORT MULTIPLE NETWORK CONNECTIONS FOR SERVER LOAD TESTING

BACKGROUND OF THE INVENTION

1. Field of the Invention

This invention relates generally to the load testing of web sites and other multi-user systems, and more particularly, the invention relates to software architectures for reducing a quantity of physical computing resources needed to generate a desired load.

2. Description of the Related Art

One aspect of server management relates to the ability of a server to handle peak loads. In the context of web sites, for example, the number of concurrent users a web site can support depends upon many factors. These factors may include: the complexity of the web site's application architecture, the number and type of servers that host the web site, the configuration of the servers, and the bandwidth of the connection(s) to the web site.

Heavy use, approaching or beyond the practical capacity of a server system, can cause response times to degrade, sometimes to the point where the system becomes practically inaccessible. Up to a certain point, as the number of users of a server system increases, the system's performance may remain at a relatively constant and acceptable level. Beyond this point, however, increased loads may cause drastic degradations in performance. Accordingly, system administrators often only become aware of an overload condition once the condition occurs.

Furthermore, the resolution of such a problem may require replacement of complete server systems, may require changes in communications systems, and/or may require the partial or total reworking of software that supports system. Depending upon whether additional equipment is available or needs to be ordered, adding servers may take from several hours to several days or even several weeks. Repairing software problems may take from several hours to several months.

In order to address these problems, software tools and services have been developed to load test web sites and other types of server systems. Examples of such tools and services include the LoadRunner® product of Mercury Interactive Corporation, and the associated hosted ActiveTest™ service for load testing server systems over the Internet. These tools and services allow the performance of a server system to be measured under various load conditions, optionally before live deployment. In this manner, the practical capacities of web sites and other multi-user server systems can be identified in advance and compared to trends in actual use levels. Accordingly, future overloading of a server system can be anticipated, and solutions can be implemented, before a problem actually occurs.

One problem with existing load testing methods is that a significant quantity of computational resources is typically needed to generate an appropriate load. For example, to generate the load needed to appropriately stress a popular e-commerce site, it may be necessary use ten or twenty dedicated computers, each of which simulates the actions of several users. The present invention seeks to address this problem.

SUMMARY OF THE INVENTION

The present invention provides an improved software architecture for simulating the actions of users during server load testing. The invention involves the use of a virtual user control flow, which is preferably a thread, that handles multiple concurrent connections to the server system during the load testing process. The use of such virtual user threads significantly reduces the number of concurrent threads needed to produce a desired load. As a result, a given computer can generate a greater load (simulate a greater number of users) than is possible with conventional methods. The computing resources needed to load test a server system are therefore reduced.

The invention is preferably embodied within a load testing tool (computer program) that may be made available to web site operators as an installable software product, as a hosted load testing service, or both. The load testing tool preferably runs several virtual users on one or more clients to simulate user interactions with a web site. Each virtual user is executed as a virtual user thread under a process on a client computer. Each virtual user thread itself establishes and supports multiple connections to the web site. Additional threads therefore need not be created for each connection.

For each connection, the virtual user thread performs a sequence of functions to establish and support the connection. Functions that may potentially block are executed in an asynchronous mode. When executed in asynchronous mode, if a function cannot complete without blocking, it immediately returns a RESOURCE UNAVAILABLE error code. If a function returns a RESOURCE UNAVAILABLE code, the calling thread switches execution to another task. After the condition causing the RESOURCE UNAVAILABLE error code has been resolved, the thread can switch back to executing the interrupted task. In this manner, the single virtual user thread is able to support multiple simultaneous connections.

In an alternative embodiment, the virtual user flow of control may be embodied as a process rather than a thread. In this case, the main flow of control supports the multiple simultaneous connections.

The invention may be advantageously used to decrease the computing resources needed to load test web sites and other types of server systems.

BRIEF DESCRIPTION OF THE DRAWINGS

A preferred embodiment of the present invention will be described below in connection with the drawings in which.

DETAILED DESCRIPTION OF THE EMBODIMENTS

In the following description, reference is made to the accompanying drawings, which form a part hereof, and which show, by way of illustration, specific embodiments or methods in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent components and methods to those described herein. In other instances, well-known methods and components have not been described in detail so as not to unnecessarily obscure aspects of the present invention.

For purposes of illustration, the invention will be described primarily in the context of the load testing of web sites. If will be recognized, however, that the invention is also applicable to load tests of other types of multi-user server systems. Unless indicated otherwise, it should be assumed that the functions set forth herein are performed using software that runs on a general purpose computer, which is connected to the server system to be tested through a computer network.

I. Prior Art Software Architectures for Server Load Testing

To facilitate an understanding of the invention and the problems to which it is directed, conventional software tools and methods for load testing servers will initially be described with reference to FIGS. 1 through 4. These tools and methods are generally described in the context of load testing web sites, but may be used to test other types of client/server system.

Figure 1A:
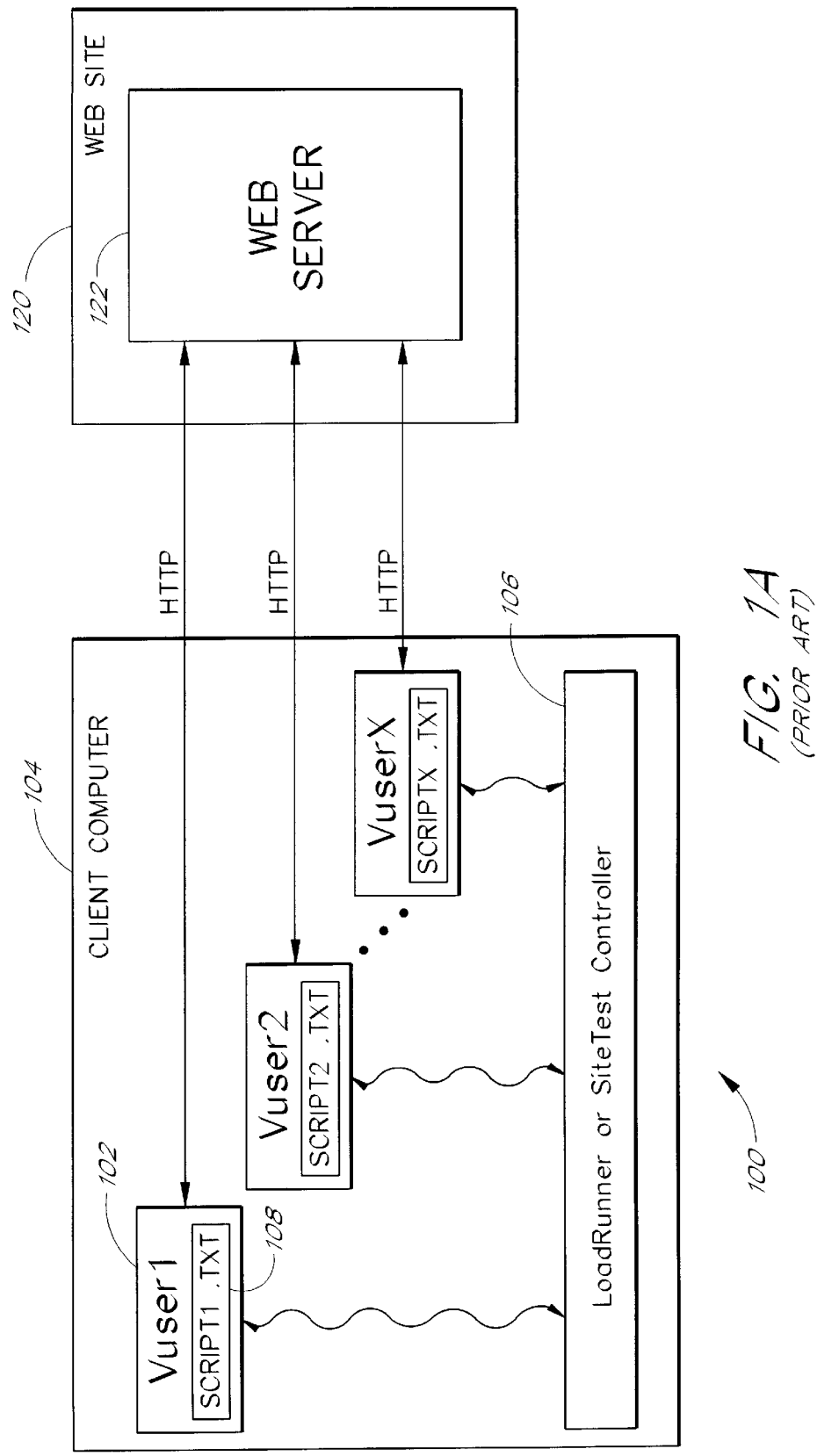
FIG. 1A illustrates an example configuration of a web site being tested by a load testing system.

FIG. 1A illustrates an example configuration of a web site 120 being tested by a load testing tool or system 100. This drawing and the associated description below is representative of both prior art load testing tools and tools that operate according to the present invention. The web site 120 is typically hosted by one or more servers 122. The load testing system 100 uses a virtual user component 102, or "Vuser," that simulates a client program's interaction with a web site 120 during a user browsing session. Each Vuser 102 sends requests to the web site 120 according to a pre-defined test script (Vuser script) 108. The script 108, which may be different for different Vusers, may be in the form of a list of the hypertext transfer protocol (HTTP) requests to be sent to the web server. The script may also specify the content of expected server responses. The script may be read from a script file by the Vuser during execution, or may be compiled within the executable Vuser code. Each request may also be a secure HTTP or HTTPS request, a file transfer protocol (FTP) request, or any type of request that may be handled by a server.

Each script 108 typically specifies a sequence of user actions for performing a particular transaction. For example, in the context of a travel reservation web site, a script may specify a search for a particular flight followed by the placement of a reservation for that flight. A Vuser 102 may be configured, via the user interface of a controller 106, to execute or "play" the script repeatedly a desired number of times (e.g., 50 iterations) during the execution of a load test. Preferably, the Vuser plays the script at a rate that is faster than the "real time" rate at which a user typically browses the web site, and thus produces a load representative of many concurrent users.

Several Vusers 102 are typically run on one or more client computers 104 under the control of the controller 106. In implementations in which the load testing tool is provided as a hosted Internet service, each client computer may be a dedicated machine that is locally connected to an Internet backbone. In typical test situations, many hundreds or thousands of Vusers 102 are run concurrently to produce a load representative of many tens of thousands of concurrent users.

During the load test, each Vuser 102 monitors the web site's response times to requests. These measured response times serve as indicators of the web site's performance, and can be aggregated and analyzed to create performance data. The performance data is typically presented to the user of the load testing tool or service through a series of predefined graphs and charts. Additional details of commercially available tools for load testing server systems are described, for example, in U.S. appl. Ser. No. 09/337,446, filed Jun. 21, 1999, the disclosure of which is hereby incorporated by reference.

Under actual, non-test conditions, each client computer 104 typically only executes one web browser at a time. In other words, only one person can typically browse the web on one computer at one time. In a test configuration, however, there is little or no advantage to executing only one Vuser 102 on each client computer 104—indeed this would be an inefficient use of resources. Each client computer 104 in a test configuration will typically have the compute power and the communications bandwidth necessary to support several hundred or even several thousands of Vusers 102. A load testing system 100, therefore, typically runs multiple Vusers on each client computer 104 to create the desired load.

A flow of control (control flow), as used herein, refers to the execution of a sequence of instructions of an application running under an operating system. In any single flow of control, the relative order in which the instructions are executed is determined by the instructions themselves as opposed to the operating system.

A process executing under an operating system generally includes a main flow of control as well as certain system resources, such as a block of virtual memory. Most operating systems support multitasking of processes (multitasking operating systems). Multitasking allows a system to switch execution among processes such that each of several processes is effectively being performed concurrently by the system. Processes, however, are generally an expensive system resource.

Most operating systems today also support the use of threads (multithreaded operating systems). A parent process can create one or more associated threads. Each thread represents a separate flow of control within its parent process. A thread, however, is a less expensive system resource than a process since a thread generally utilizes system resources already allocated to its parent process, such as the virtual memory space of the parent process. Several threads can be spawned within a process to implement concurrent control flows within a single process.

Figure 1B:
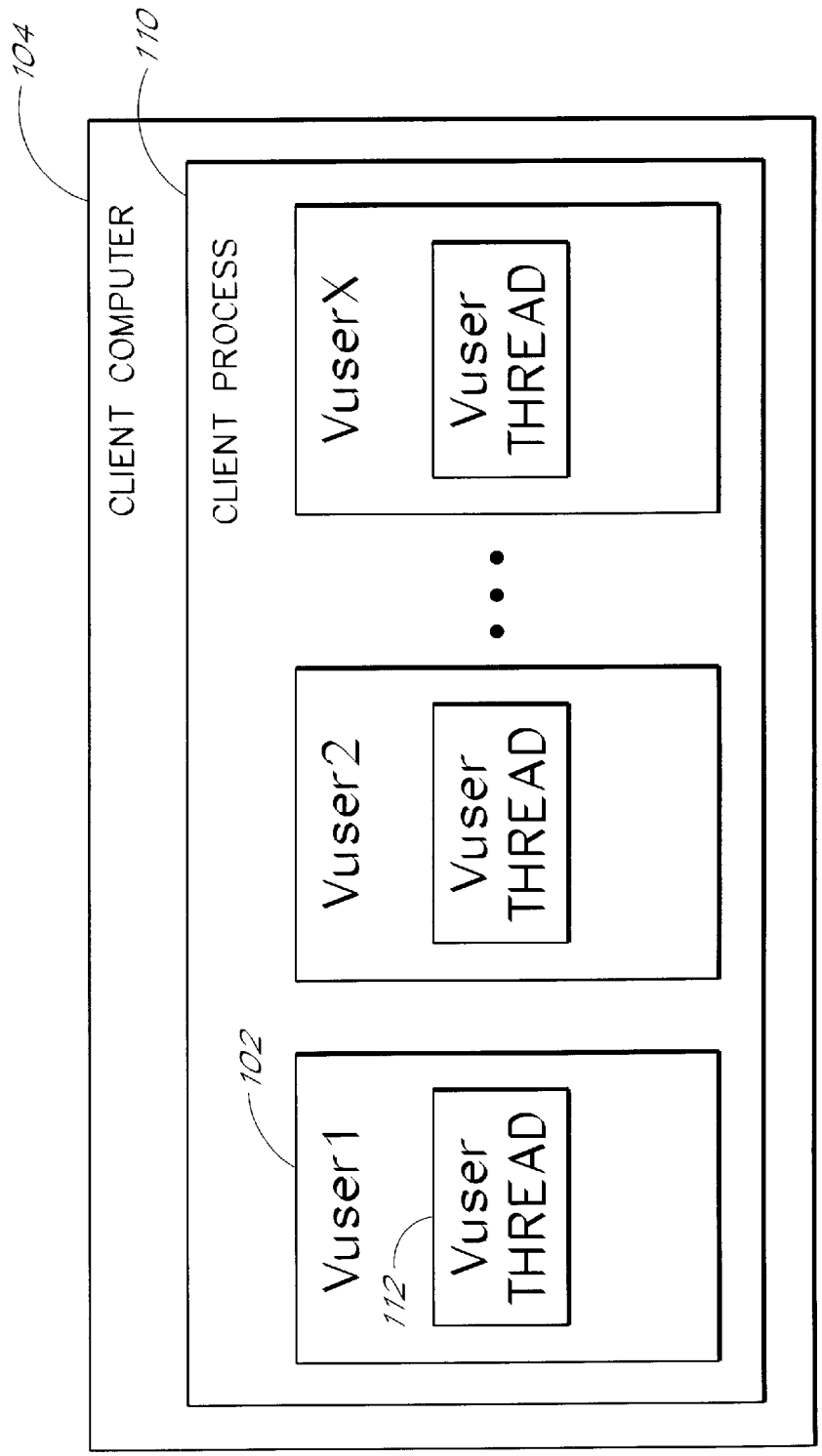
FIG. 1B illustrates the several virtual users executing under a client process on a client computer.

As illustrated in FIG. 1B, in order to conserve system resources, several Vusers are typically run under one client process 110 as opposed to running each Vuser as a separate process. The main flow of control for each Vuser is typically a Vuser thread 112, which, although still an expensive system resource, is less expensive than a process.

Figure 2:
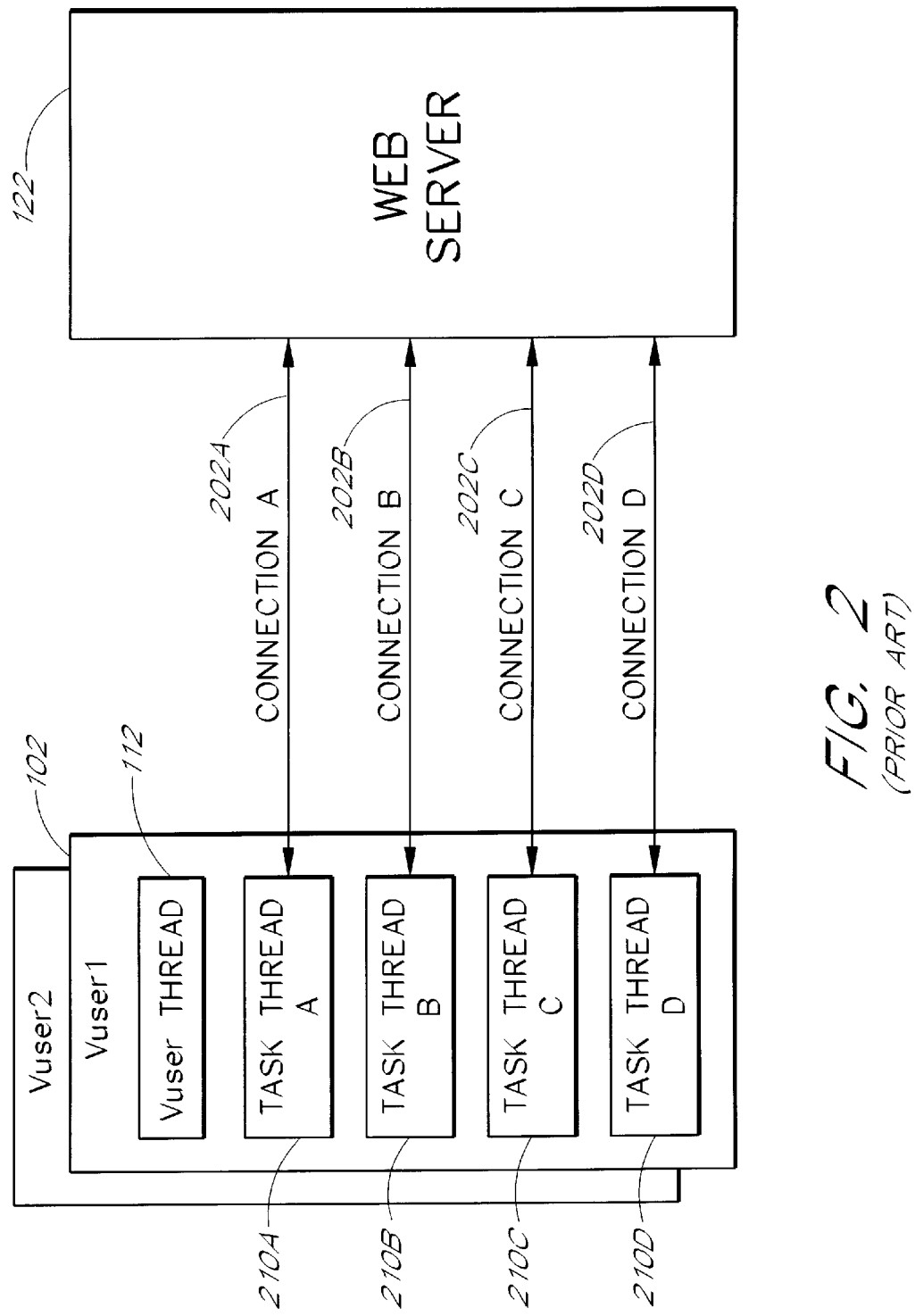
FIG. 2 illustrates the connections through which a virtual user communicates with a server.

FIG. 2 illustrates the connections 202A–D through which a Vuser 102 communicates with a web server. Each time an HTTP request is made, whether by a real user browsing the web through a web browser or by a Vuser 102, the request is sent and a response received through a connection to the web server. HTTP requests generally take some time to be fulfilled, ranging from a fraction of a second to several seconds or even minutes. Each request also typically requires its own flow of control and can oftentimes be a blocking (stalling) task. In order to increase data throughput and decrease latency, a Vuser 102 (or a web browser) typically generates several simultaneously outstanding requests. Since each request is generally a blocking task, the Vuser thread 112 spawns a new thread 210A to handle the request. The thread 210A typically generates the request and opens the connection 202A. The thread 210A persists until the response is received and the connection 202A closed, at which time the thread 210A is destroyed.

Vusers 102 (or web browsers) are typically configured to allow up to four simultaneous connections to support up to four outstanding requests, however this number can be adjusted. Once there are four outstanding requests, additional requests are deferred until one of the outstanding requests has been satisfied. Vusers 102, in order to properly simulate real users using web browsers, are also typically configured to support up to four simultaneous outstanding requests 202A–D, each supported by an associated thread 210A–D.

When a client computer is executing a single web browser, the additional four threads present an inconsequential demand on the system. A load testing host, however, may be running 1000 Vusers 102, and if each Vuser 102, has 4 additional threads, the system has to support an additional 4000 threads. When used in such large numbers, the additional overhead necessary to support these additional threads becomes a substantial burden on the system.

Figure 3:
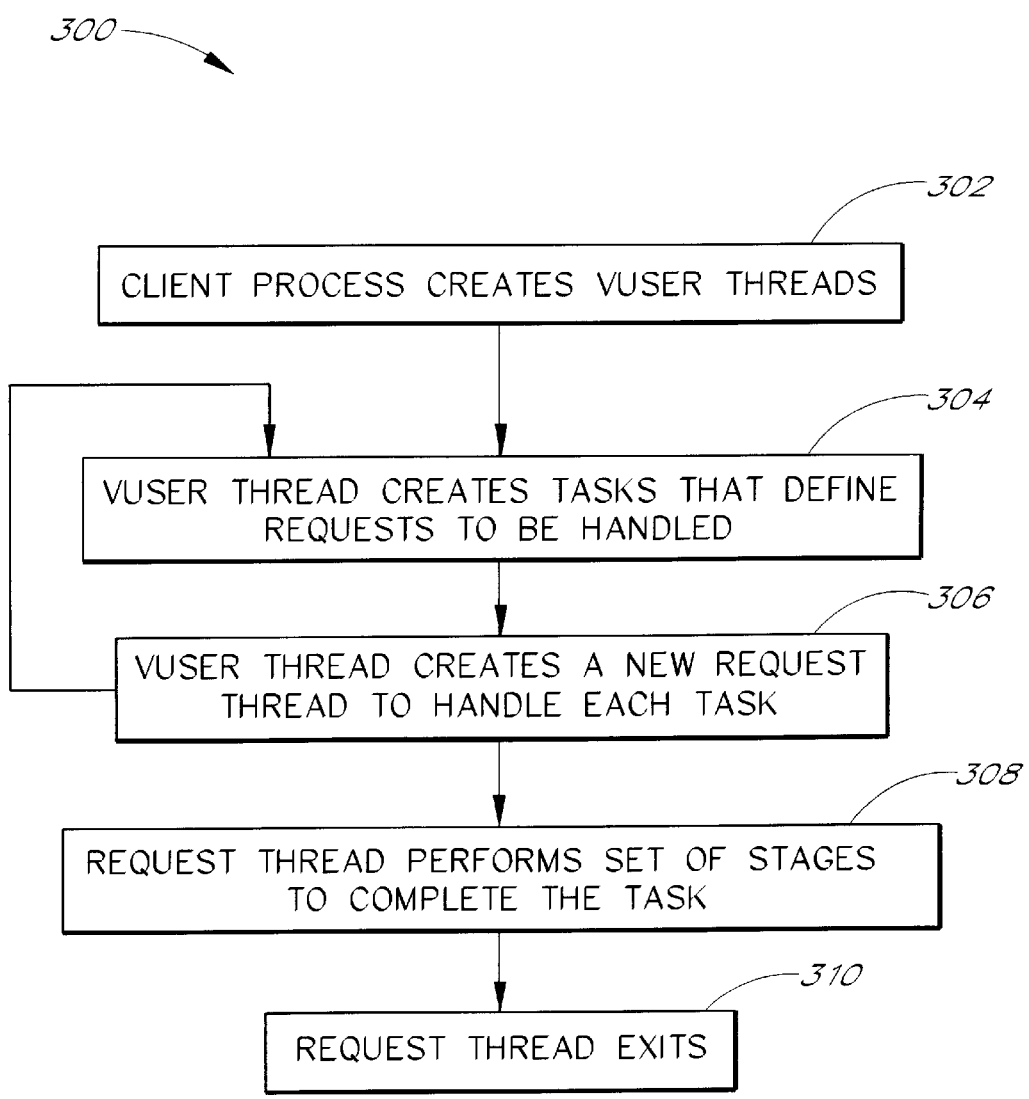
FIG. 3 illustrates a known method performed by the client process during a load test of a server.

FIG. 3 illustrates a known method 300 performed by the client process 110 during a load test of a server 122. At a step 302, the client process 110 creates a plurality of Vusers 102. Each Vuser 102 is typically embodied as a separate Vuser thread 112. The functionality of each Vuser 102 is typically specified by a Vuser script 108.

At a step 304, a Vuser thread 112 generates one or more tasks based upon the Vuser script 108. Each task defines an exchange of data between the client computer 104 and a web server. In the case that a web server 122 is being load tested, the task typically defines an HTTP request specified in the Vuser script 108. The HTTP request specifies the method (e.g., GET or POST), the uniform resource locator (URL), and the request body or data of the request. The request may alternatively be a secure HTTP (HTTPS) request, a file transfer protocol (FTP) request, or any type of request that may be handled by a server. All of the Vuser threads 112 created in the step 302 may perform the step 304 concurrently and repeatedly as necessary.

At a step 306, a Vuser thread 112 creates a new task thread 210A to handle each task. The newly created thread 210A results in a separate flow of control in which the task is performed, as illustrated by the arrow that leads to a step 308. The Vuser thread 112 is also free to continue with its own flow of control and possibly create additional tasks and threads 201B–D, as illustrated by the arrow that loops back to the step 304.

Figure 4:
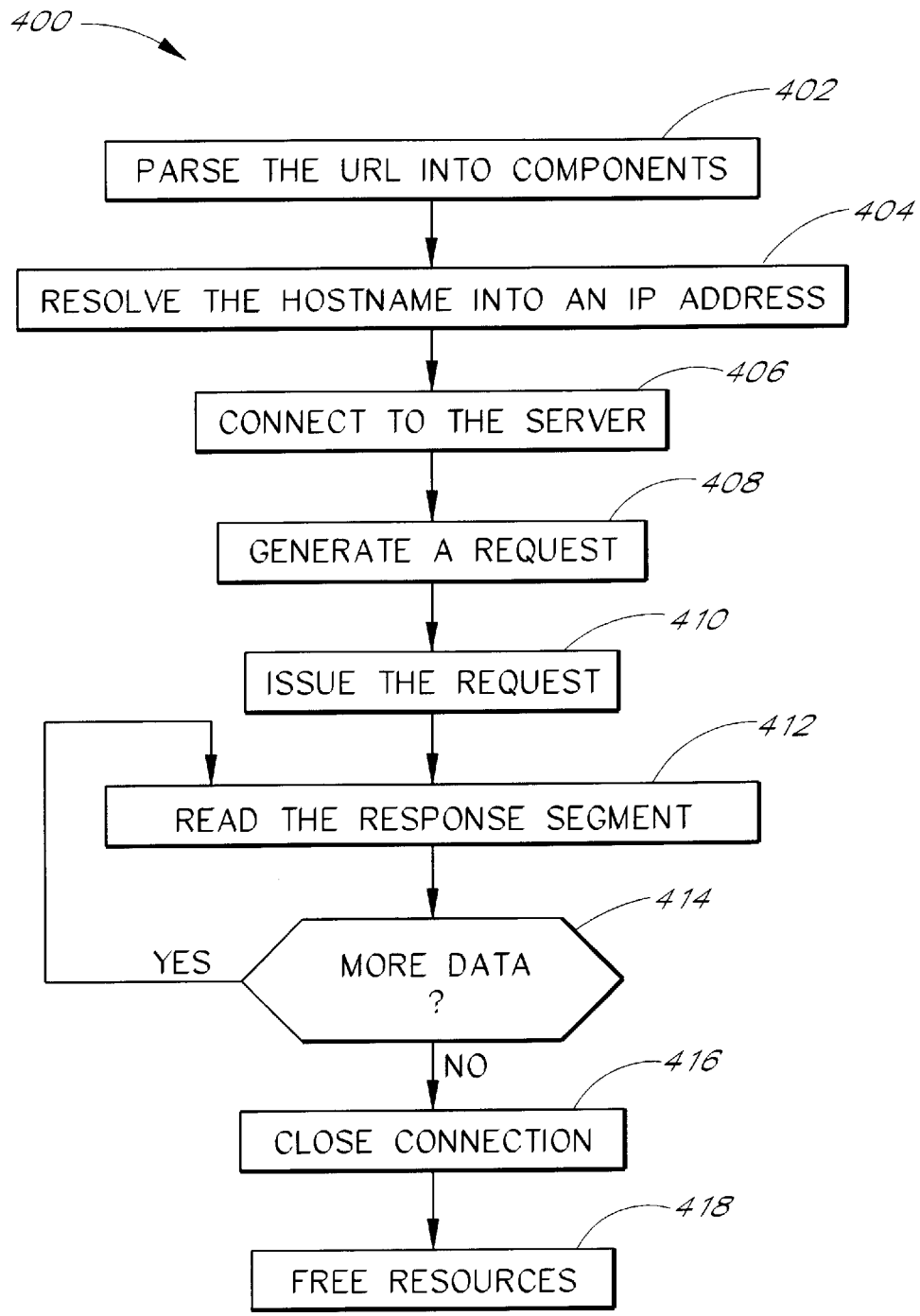
FIG. 4 illustrates the set of stages performed by each task thread in handling each task.

At the step 308, the task thread 21 OA performs a set of stages 400 to complete the task. The set of stages 400 is illustrated in FIG. 4 and described below. At a step 310, once the task has been successfully completed, the task thread 210A exits. If the maximum number of connections permitted by the Vuser had been outstanding prior to the step 310, the Vuser may now create an additional thread to handle another task in accordance with the steps 304 and 306.

FIG. 4 illustrates the set of stages 400 performed by each task thread 210 in handling each task during a load test of a web server 122. The set of stages 400 and their implementation will be familiar to one skilled in the art. Several of the stages are potentially blocking, which means that the stage may involve an unpredictable delay before completion.

At a first stage 402, the thread 210 parses the URL into its components. The components may include the host name, the port, the path, etc. This stage typically is non-blocking and will not cause a wait. At a stage 404, the thread 210 resolves the host name into an IP address. Typically, the stage 404 requires the querying of a name server, and therefore this stage may block or cause a wait.

At a stage 406, the thread 210 establishes a connection to the server 122, which can cause the thread to block. At a step 408, the thread 210 generates a request, which preferably includes headers and a body. At a stage 410, the thread 210 issues (sends) the request, which can cause the thread 210 to block. In the case the request is long, the request may be transmitted in multiple segments.

At a stage 412, the thread 210 reads a response segment, which is returned by the server 122. The stage 412 can cause the thread 210 to block. At a stage 414, if there is more data expected or to be received, the thread repeats the step 412 as necessary. If the thread 210 has completed reading the data, it proceeds to the stage 416. At the stage 416, the thread 210 closes the connection, and at a stage 418, the thread 210 frees any unnecessary resources.

Each stage is typically carried out by calling one or more functions. Each function call represents a request that certain functionality be performed. Many of the functions are operating system functions, in which case the operating system generally carries out the requested functionality. Some of the functions, however, may be supplied by the programmer. In this case, the supplied function itself may carry out the requested functionality. Alternatively, the supplied function may be configured to call other functions, possibly including operating system functions, to carry out the requested functionality. The programmer may also choose to write his own versions of some of the operating system supplied functions.

Several of the functions used to carry out the potentially blocking stages 404–416 will block upon being called if the functionality to be performed cannot completed immediately. A potentially blocking function generally blocks because a required resource is not available at the time the function is called. If a function blocks, the thread that called the function cannot proceed until the resource becomes available and the called function returns. If the resource does not become available within a certain amount of time, the function may time out and return an error code. Since each request is handled by a separate thread, each thread can safely block without affecting concurrent execution of the Vuser thread 112 or the other task threads 210.

Functions that may potentially block typically also support an asynchronous mode. When a function is executed in an asynchronous mode, the function will always return without blocking, regardless of whether the requested functionality has been completed. If the requested functionality has been completed, the called function generally returns a code indicating successful completion. If the requested functionality has not been completed, however, the called function will return an error code. In some cases the error code indicates that the requested functionality cannot be performed due to a fatal error.

When the functions are called in asynchronous mode, however, most error codes are of a type hereinafter referred to in general as RESOURCE UNAVAILABLE error codes. A RESOURCE UNAVAILABLE error code indicates that a required resource is not available at the time the function is called and performing the requested functionality would cause the calling thread to block. As a result, the called function returns immediately with a RESOURCE UNAVAILABLE error code. In some implementations, such as Unix and Windows Sockets, the called function does not perform the requested functionality and must be called again after returning the RESOURCE UNAVAILABLE code. Typically, upon being called again, the function eventually returns a code indicating successful completion. In other implementations such as the Microsoft Windows Win32 Internet API (WinInet), the called function causes the requested functionality to be performed in the background after returning the RESOURCE UNAVAILABLE error code. The calling thread is eventually notified of completion of the requested functionality through the calling of a predefined callback function. In these implementations, the function needs to be called only once.

The RESOURCE UNAVAILABLE error code is typically a named constant and is typically specified in a program code header file. The name of a RESOURCE UNAVAILABLE error code typically depends upon the implementation used. For example, in Unix Sockets implementations, the RESOURCE UNAVAILABLE code is typically called EWOULDBLOCK or EAGAIN. In the Windows Sockets (WinSock) implementations, the RESOURCE UNAVAILABLE code is typically called WSAEWOULDBLOCK. In the WinInet environment, the RESOURCE UNAVAILABLE code is typically called ERROR_IO_PENDING.

Figure 5:
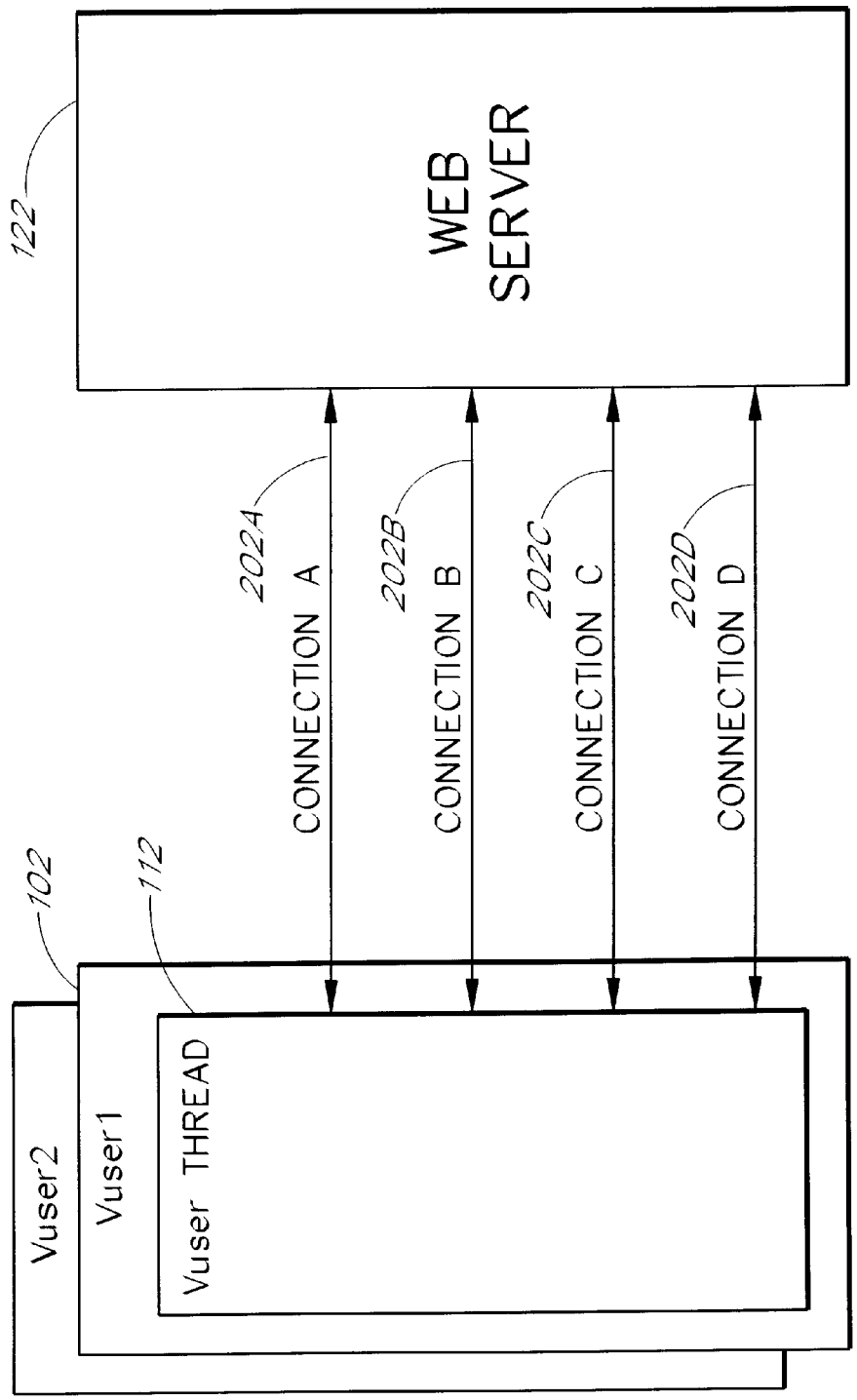
FIG. 5 illustrates a preferred embodiment of the present invention in which a virtual user thread itself handles requests and supports two or more connections to a server computer.

II. Modified Load Testing Tool and Architecture for Supporting Multiple Connections Through a Single Thread A. Overview of Components FIG. 5 illustrates a preferred embodiment of the present invention in which a Vuser thread 112 itself supports two or more connections 202 to a server computer 122. Instead of creating a new thread to handle each new request, one thread, preferably the Vuser thread, is used to handle multiple outstanding requests simultaneously so that no new threads need be created. The system is therefore not burdened with the expense and overhead of additional threads. The reduction of the required system resources for simulating Vusers allows additional Vusers to be run on each client computer. As a result, a higher simulated load can be created using the same amount of computing resources. Alternatively, a test can be conducted using fewer computing resources.

B. General Method

Figure 6:
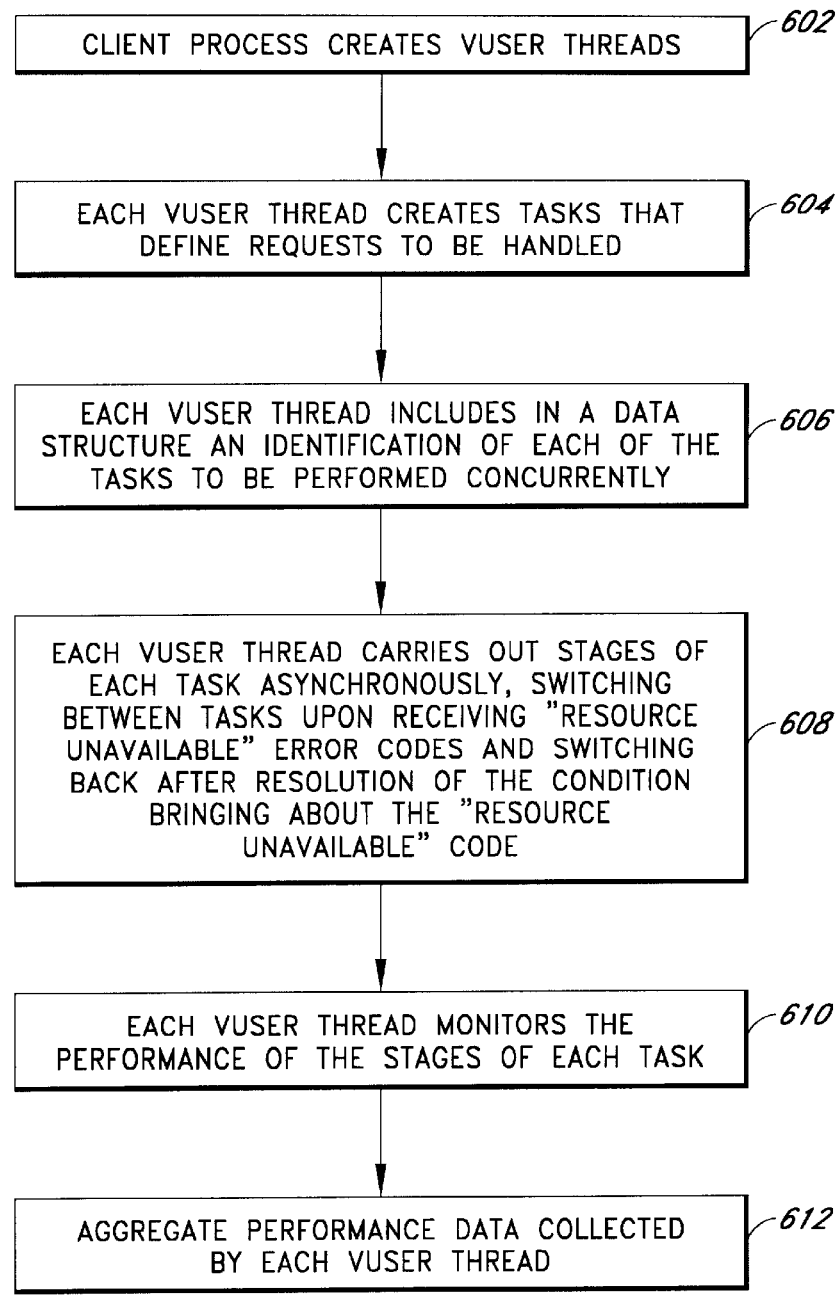
FIG. 6 illustrates a preferred method for supporting multiple simultaneous connections between a client computer and one or more servers with a single thread.

FIG. 6 illustrates a general method 600 for supporting multiple simultaneous connections between a client computer and one or more servers within a single thread. The single thread is preferably a Vuser thread 112. Several Vuser threads 112, however, are preferably created through the method 600, and each Vuser thread 112 supports multiple simultaneous connections.

In the preferred embodiment, each connection is in the form of a socket that is opened using the TCP/IP protocol. Typically, the socket is closed once the server has responded to a user request. The Vuser test scripts may, however, include standard HTTP commands that instruct the server to keep a socket open.

At a step 602, the client process 110 creates one or more Vusers 102 and preferably several Vusers 102. Each Vuser 102 is preferably embodied as a separate Vuser thread 112. The functionality of each Vuser 102 is preferably specified by a Vuser script 108 as set forth above. The remaining steps of the method 600 are preferably performed for each Vuser 102 that has been created. The step 602 may be repeated as necessary to create additional Vuser threads 112.

At a step 604, a Vuser thread 112 generates one or more tasks based upon the Vuser script 108. Each task defines an exchange of data between the client computer 104 and a server. In the case that a web server 122 is being load tested, the task typically defines an HTTP request specified in the Vuser script 108. The HTTP request specifies the method (e.g., GET or POST), the uniform resource locator (URL), and the request body or data of the request. The request may alternatively be an HTTPS request, an FTP request, or any type of request that may be handled by a server. All of the Vuser threads 112 created in the step 602 may perform the step 604 concurrently and repeatedly as necessary.

At a step 606, the Vuser thread 112 includes in a data structure an identification of each of the tasks to be handled concurrently. The data structure is preferably a linked list, but may be any data structure capable of holding or identifying tasks. The steps 604 and 606 are preferably, but need not be, performed together.

At a step 608, the Vuser thread 112 carries out the stages of each task. The functions of each stage are carried out asynchronously so that the functions do not cause the thread to block. If a function returns a RESOURCE UNAVAILABLE error code, the thread switches execution to another task. After the condition causing the RESOURCE UNAVAILABLE error code has been resolved, the calling thread can switch back to executing the interrupted task. The Vuser thread 112 preferably uses the data structure to keep track of the tasks being carrying out. In this manner, the single Vuser thread 112 is able to support multiple simultaneous connections.

At a step 610, the Vuser thread 112 monitors the performance of the stages of each task. In the preferred embodiment, the Vuser thread 112 monitors the elapsed time between the sending of the request and the receipt of the response. The step 610 is preferably performed with the step 608.

At a step 612, the client process 110 or the controller 106 preferably aggregates the performance data collected by each Vuser thread 112. The data can then be analyzed to determine system performance.

The following subsections describe preferred methods for concurrently carrying out the stages a plurality of tasks in accordance with the step 608.

C. Sockets Implementations

Figure 7:
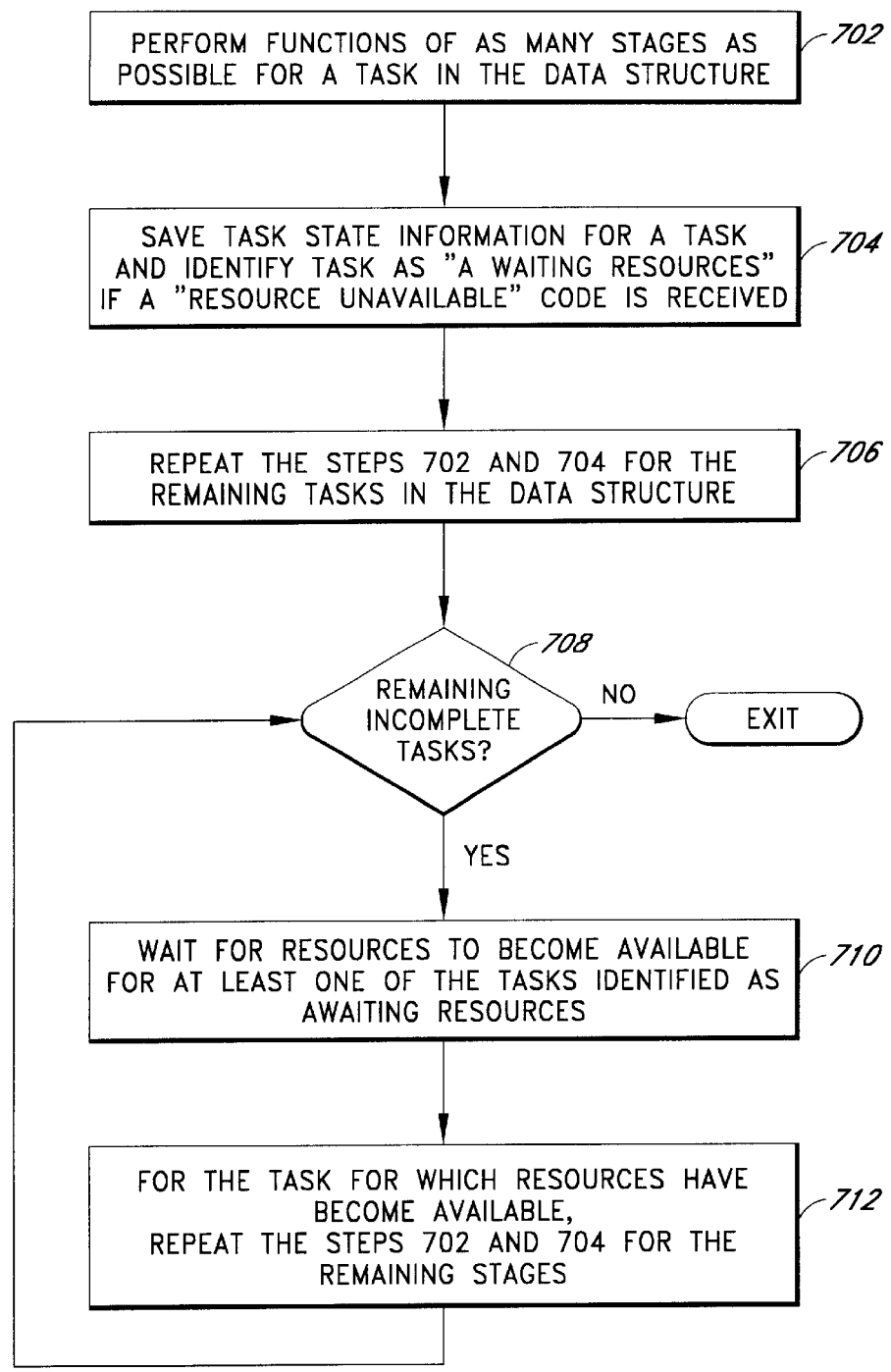
FIG. 7 illustrates a preferred method applicable to Unix and Windows Sockets implementations for concurrently carrying out the stages of a plurality of tasks.

FIG. 7 illustrates a preferred method 700 applicable to Sockets implementations, such as Unix and Windows, for concurrently carrying out the stages of a plurality of tasks. In Sockets implementations, although the requested functionality is not performed when a RESOURCE UNAVAILABLE code is received, a function can again be called successfully when the required resources become available. This asynchronous mode functionality is applied in the method 700.

At a step 702, the Vuser thread 112 performs as many stages as possible for a task in the data structure. The functions of each stage are preferably called in sequence until either a RESOURCE UNAVAILABLE return code is received or the task completes. Potentially blocking functions are executed in an asynchronous mode.

At a step 704, if a RESOURCE UNAVAILABLE code is received from a function, the Vuser thread 112 saves state information that describes the state of the associated task at the point the RESOURCE UNAVAILABLE code is received. The state information allows the remainder of the task to be completed when execution of the task is resumed. The Vuser thread 112 also preferably identifies the associated task as "awaiting resources."

At a step 706, the Vuser thread 112 repeats the steps 702 and 704 for the remaining tasks in the data structure.

At a step 708, the Vuser thread 112 determines whether there are any tasks that have received a RESOURCE UNAVAILABLE return code and have yet to complete. If so, the Vuser thread 112 passes control to a step 710. If not, the Vuser thread exits the method 700.

At the step 710, the Vuser thread 112 waits for resources to become available for at least one of the tasks identified as "awaiting resources." The Vuser thread 112 also identifies the tasks for which resources have become available. If resources are available immediately, the Vuser thread 112 need not wait.

In a Sockets implementation, the Vuser thread 112 preferably performs the step 710 by calling the "select" Sockets function call. The Vuser thread 112 identifies in the function call all of the resources for which all of the tasks are waiting. The select function call returns as soon as any of the resources become available or when a timeout expires. Upon return of the "select" call, the Vuser thread 112 preferably calls the "is_set" function to determine for which tasks resources have become available. The "is_set" function may also be called before the "select" function call, and if resources are available for a task, the "select" call need not be made.

At a step 712, the Vuser thread 112 repeats the steps 702 and 704 for the remaining stages of the task(s) identified in the step 710. For each task, the saved state information is restored and the stages of the task are continued with the function that returned the last RESOURCE UNAVAILABLE return code.

After the step 712, the Vuser thread 112 returns control to the step 708 to process the remaining tasks until all of the tasks have been completed.

D. WinInet Implementation

Figure 8:
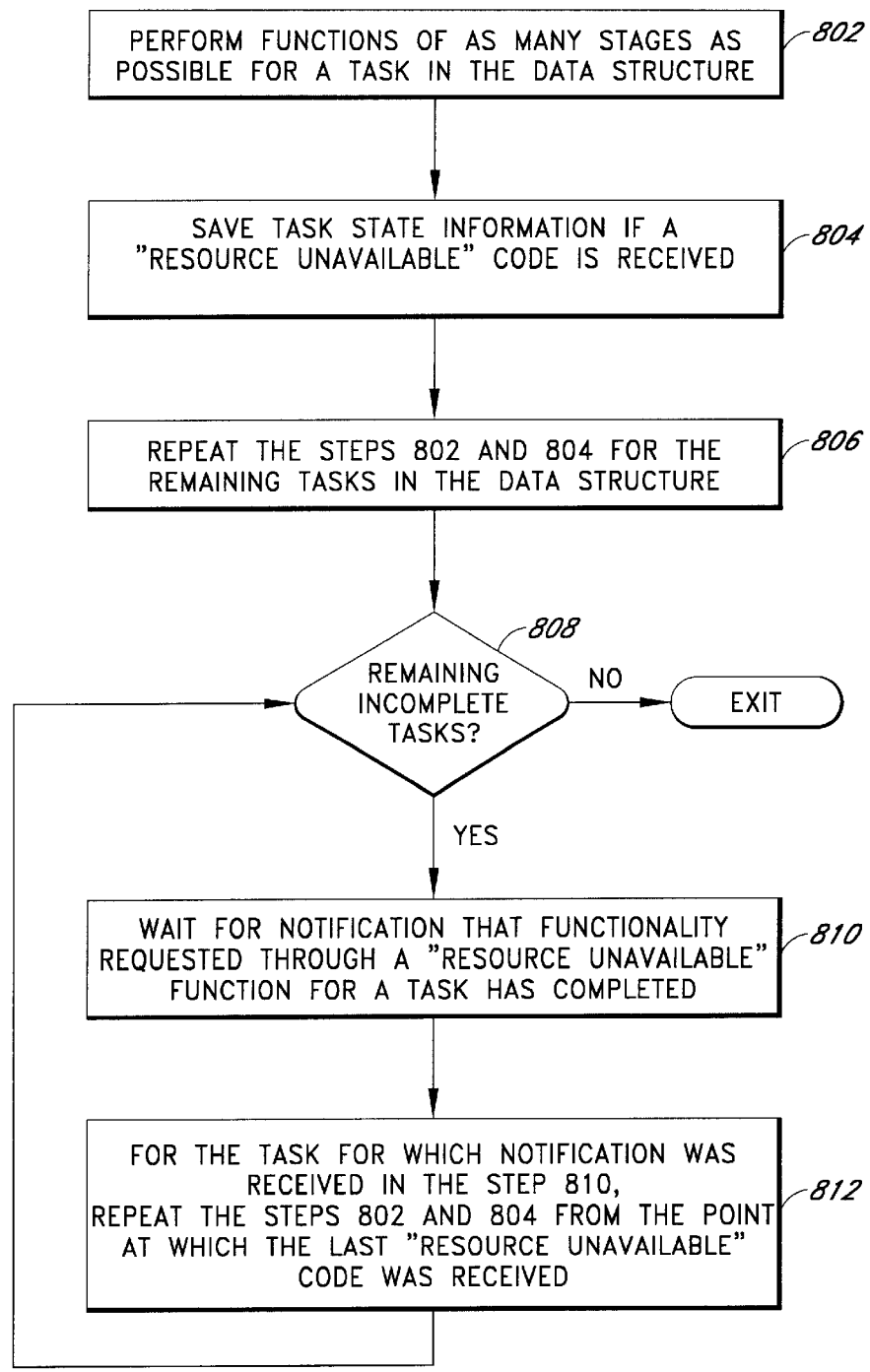
FIG. 8 illustrates a preferred method applicable to the Microsoft Windows Win32 Internet API (WinInet) for concurrently carrying out the stages of a plurality of tasks.

FIG. 8 illustrates a preferred method 800 applicable to the Microsoft Windows Win32 Internet API (WinInet) for concurrently carrying out the stages of a plurality of tasks. In WinInet implementations, although a function may return immediately with a RESOURCE UNAVAILABLE (ERROR_IO_PENDING) code, the requested functionality is still performed in the background by the WinInet. The calling thread is eventually notified of completion of the requested functionality through a predefined callback function. The function, therefore, needs to be called only once.

At a step 802, the Vuser thread 112 performs as many stages as possible for a task in the data structure. The functions of each stage are preferably performed in sequence until either a RESOURCE UNAVAILABLE return code is received or the task completes. Functions are executed in an asynchronous mode by specifying asynchronous mode upon initialization of WinInet.

At a step 804, if a RESOURCE UNAVAILABLE code is received from a function, the Vuser thread 112 saves state information that describes the state of the associated task at the point the RESOURCE UNAVAILABLE code was received. The state information allows the remainder of the task to be completed upon completion of the requested functionality.

At a step 806, the Vuser thread 112 repeats the steps 802 and 804 for all of the tasks in the data structure.

At a step 808, the Vuser thread 112 determines whether there are any tasks that have received a RESOURCE UNAVAILABLE return code and have yet to complete. If so, the Vuser thread 112 passes control to a step 810. If not, the Vuser thread exits the method 800.

At the step 810, the Vuser thread 112 waits until it receives notification that some functionality, which was requested through one of the functions that returned RESOURCE UNAVAILABLE, has been completed. The calling thread is preferably notified of the completion through a predefined callback function.

At a step 812, the Vuser thread 112 repeats the steps 802 and 804 for the task for which notification was received in the step 810. The stages of the task are continued from the point at which the last RESOURCE UNAVAILABLE return code was received for the task.

After the step 812, the Vuser thread 112 returns control to the step 808 to process the remaining tasks until all of the tasks have been completed.

III. Applicability, Alternative Embodiments and Additional Features

The software architecture and methods set forth above may be incorporated into existing load testing tools and services, such as the LoadRunner® program and associated ActiveTest™ service of Mercury Interactive Corporation. Additional details of LoadRunner and ActiveTest are set forth in U.S. Pat. No. 5,974,572, and U.S application Ser. No. 09/484,684, filed on Jan. 17, 2000, the disclosures of which are hereby incorporated by reference.

It will be apparent to one skilled in the art that various modifications and alternations can be made to the methods 600, 700, and 800 within the scope of the invention. For example, tasks can be removed from the data structure as they are completed. New tasks can also be added to the data structure as completed ones are removed.

The present invention is particularly applicable to modern multithreaded operating systems. In this context, several Vusers 102 can also be executed under a single thread. The invention may, however, be applied in the context of processes that do not include multiple threads. For example, each Vuser 102 may be executed as a separate process rather than as a separate thread within a process. The methods 700 or 800 can then be performed by the process itself.

A number of additional features can be added to the methods 600, 700, and 800 to further increase the performance of a load testing system. In one embodiment, a connection can be maintained after a request has completed. The connection can then be used for additional requests. In one embodiment, the results of performing certain stages for one task may be reused to perform the same stages for other tasks. For example, in most cases a hostname need only be resolved into an IP address one time. Thereafter, the resolved IP address can be cached and used whenever the same hostname appears again.

IV. Conclusion

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the method claims, reference characters are used for convenience of description only, and do not indicate a particular order for performing the method.

What is claimed is:

1. A method of testing the load handling capability of a server system, the method comprising, on a client computer:

(A) within a single virtual user thread, concurrently performing a plurality of tasks, wherein each task comprises:

establishing a connection to the server system, sending a request through the connection, and receiving a response through the connection; and (B) for each task, monitoring an elapsed time between the sending of the request and the receipt of the response.

2. The method of claim 1, further comprising, on the client computer, collecting the monitored elapsed times for the plurality of tasks.

3. The method of claim 1, further comprising, on the client computer, creating a plurality of virtual users, wherein each virtual user performs (A).

4. The method of claim 3, wherein each virtual user is configured to simulate the interactions of a client program with the server system.

5. The method of claim 1, wherein the virtual user thread is the main control flow of a virtual user.

6. The method of claim 1, wherein the (A) comprises:

(A-1) for each task, initiating functions to perform the task, wherein the functions are initiated in an asynchronous mode and in order until one of the following occurs: a RESOURCE UNAVAILABLE code is returned by a function, and the task completes; and (A-2) for each task, if a RESOURCE UNAVAILABLE code is received from a function, saving state information that is descriptive of the state of the associated task at the point at which the RESOURCE UNAVAILABLE code is received.

7. The method of claim 6, wherein (A) further comprises:

(A-3) receiving notification that functionality requested through a function has completed; and (A-4) performing (A-1) and (A-2) for the task for which notification was received in (A-3) for any remaining functions from the point at which the RESOURCE UNAVAILABLE code is received.

8. The method of claim 7, wherein (A) comprises:

(A-5) repeating (A-3) and (A-4) until all of the tasks have been completed.

9. A software module embodied within a computer readable medium, the software module comprising executable code that, when executed by a computer:

spawns a virtual user thread that submits user requests to a server system through multiple concurrent connections such that multiple user requests are pending concurrently; and monitors responses from the server system to the multiple user requests through the multiple connections to monitor performance of the server system.

10. The software module as in claim 9, wherein the virtual user thread concurrently performs multiple tasks that correspond to the multiple user requests, and switches between individual tasks of the multiple tasks in response to notifications of resource availability conditions.

11. The software module as in claim 10, wherein the virtual user thread performs stages of each task asynchronously.

12. The software module as in claim 9, wherein at least some of the user requests are HTTP requests directed to a web site.

13. The software module of claim 9, wherein the executable code is configured to:

(A) perform a plurality of tasks, wherein each task is performed through at least one associated function through which functionality is requested, and wherein performing each task comprises establishing a connection to the server system, sending a request through the connection, and receiving a response from the server system through the connection;

(B) initiate, for each task, the associated functions for the task, wherein the functions are initiated in an asynchronous mode and in order until one of the following occurs: a RESOURCE UNAVAILABLE code is returned by a function, and the task completes; and (C) for each task, if a RESOURCE UNAVAILABLE code is received from a function, save state information that is descriptive of the state of the associated task at a point at which the RESOURCE UNAVAILABLE code is received.

14. The software module of claim 13, wherein the executable code is further configured to:

(D) receive notification that functionality requested through a function has completed; and (E) perform (B) and (C) for the task for which notification was received in (D) for any remaining functions from the point at which the RESOURCE UNAVAILABLE code is received.

15. The software module of claim 14 wherein the executable code is further configured to:

(F) repeat (D) and (E) until all of the tasks have been completed.

16. The software module of claim 15, wherein the executable code is configured to:

create a plurality of virtual user threads; and for each virtual user thread, perform (A), (B), (C), (D), (E) and (F).

17. The software module of claim 13, wherein the executable code is configured to:

(D) wait for resources to become available for any task for which a RESOURCE UNAVAILABLE code has been received; and (E) for a task for which resources have become available in (D), perform (B) and (C) beginning with the function that returned the RESOURCE UNAVAILABLE code.

18. The software module of claim 17, wherein the executable code is further configured to:

(F) repeat (D) and (E) until all of the tasks have been completed.

19. The software module of claim 18, wherein the executable code is further configured to perform (A), (B), (C), (D), (E), and (F) for each of a plurality of threads.

20. A virtual user system for server load-testing, the virtual user system comprising:

a thread; and a plurality of concurrent connections to a server system, wherein the plurality of concurrent connections are established by the thread;

wherein the thread sends requests to the server system over the plurality of concurrent connections to apply a load to the server system.

21. The virtual user system of claim 20, wherein the thread is the main control flow of the virtual user system.

22. The virtual user system of claim 20, wherein the plurality of connections are supported by the thread.

23. The virtual user system of claim 20, further comprising at least one additional thread.

24. The virtual user system of claim 20, wherein the thread concurrently performs multiple tasks that correspond to multiple user requests.

25. The virtual user system claim 24, wherein at least some of the user requests are HTTP requests directed to a web site.

26. The virtual user system of claim 24, wherein the thread switches between individual tasks of the multiple tasks in response to notifications of resource availability conditions.

27. The virtual user system of claim 26, wherein the thread performs stages of each task asynchronously.

28. The virtual user system of claim 20, further comprising a client computer that executes the thread to load test the server system over a network connection, wherein the plurality of concurrent connections are established between the client computer and the server system.

29. The virtual user system of claim 20, wherein the thread monitors response times to user requests sent over each of the plurality of concurrent connections to monitor performance of the server system.

30. A software module embodied within a computer readable medium, the software module comprising executable code that, when executed by a computer, provides a virtual user system as in claim 20.

* * * * *